United States Patent

Coats

[15] 3,652,108
[45] Mar. 28, 1972

[54] EXHAUST PIPE BALL CONNECTOR
[72] Inventor: David E. Coats, San Francisco, Calif.
[73] Assignee: Western Piping & Engineering Co., Inc.
[22] Filed: Sept. 24, 1970
[21] Appl. No.: 75,104

[52] U.S. Cl. ..................................................285/165
[51] Int. Cl. ....................................................F16l 27/02
[58] Field of Search ..........................285/165, 166, 261

[56] References Cited

UNITED STATES PATENTS

| | | | |
|---|---|---|---|
| 2,219,752 | 10/1940 | Rohr | 285/166 |
| 2,329,369 | 9/1943 | Haver | 285/166 |
| 2,502,753 | 4/1950 | Rohr | 285/166 |

*Primary Examiner*—Andrew V. Kundrat
*Attorney*—Lothrop & West

[57] ABSTRACT

An exhaust pipe ball connector has two iron rings with outer spherical surfaces. A sheet metal exit sleeve has a spherical end embracing one ring. A sheet metal downstream tube is beaded and flanged to engage the inside of that ring. A sheet metal upstream tube at one end telescopes into the downstream tube, with an annular seal between the telescoping portions, and at the other end is spherical and embraces the other ring. A sheet metal entrance sleeve is beaded and flanged to engage the inside of the other ring.

5 Claims, 1 Drawing Figure

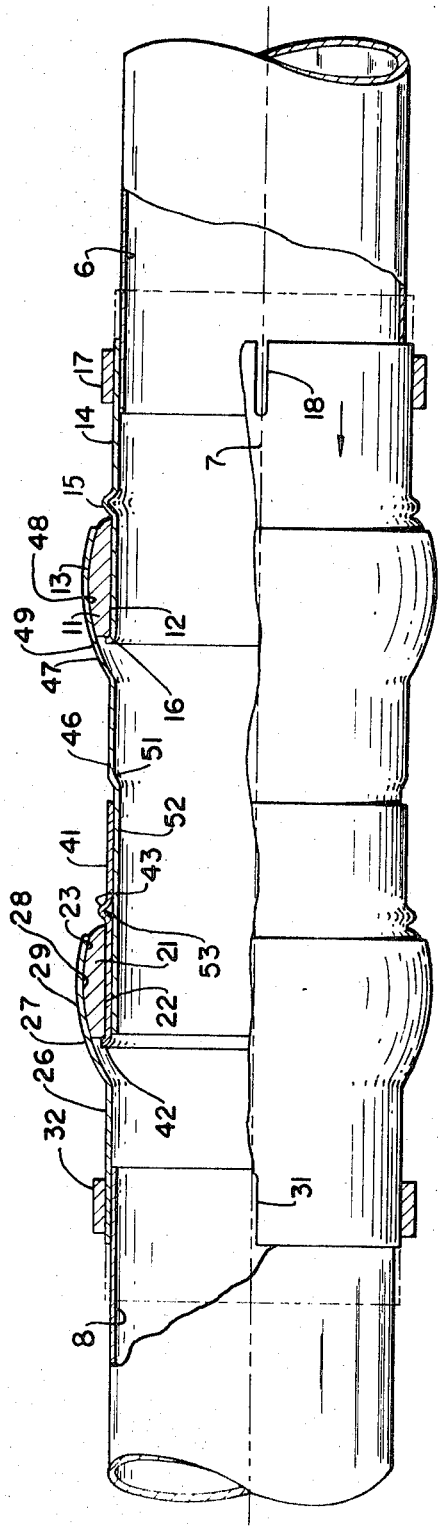
INVENTOR.
DAVID E. COATS
BY Lothrop & West
ATTORNEYS

EXHAUST PIPE BALL CONNECTOR

Many different connections have been designed and utilized for conveying exhaust gas from an engine or turbine to a point of release and also having the property of moving or shifting either an initial installation only or during ordinary use. The motion is usually designed to compensate in some part for expansion and contraction of the connector itself. Sometimes the motion is to allow operational movement between the source of the exhaust gas and its discharge mechanism. Sometimes the motion is only needed for initial installation to accommodate any dimensional discrepancies that may arise in individual cases between the device from which the exhaust issues and the structure into which it is discharged. Sometimes all of these factors are involved.

Among devices of this sort are those shown in U.S. Pat. Nos. 2,219,752, issued Oct. 29, 1940, to F. H. Rohr and 2,329,369, issued Sept. 14, 1943, to R. L. Haver. The Rohr and Haver joints have gone into wide-spread use and have generally been quite satisfactory and successful. I have found, however, that particularly in automotive installations, as distinguished from aircraft installations for which the Rohr and Haver devices are particularly adapted, and especially in connection with joints or connectors for trucks, buses and the like that while some accommodation to varied dimensions at initial installation is highly desirable, it is not always necessary to provide for a great deal of other motion in the connector except possibly that due to normal expansion and contraction of the structure itself. However, what motion is found between the relatively movable parts usually occurs not when the parts are at atmospheric temperature and can readily move with respect to each other but occurs when the parts are at elevated temperatures. Sometimes all the parts are not at the same elevated temperatures. This sometimes results either in initial difficulty with fitting and with gas leakage at relatively low temperatures or with gas leakage and rapid material wear at elevated temperatures.

It is therefore an object of my invention to provide an exhaust pipe ball connector, especially for truck and bus use which operates well over a wide temperature range from atmospheric temperature up to relatively high temperatures.

Another object of the invention is to provide an exhaust pipe ball connector in which the gases being carried have little or no opportunity to leak or seep.

Another object of the invention is to provide an exhaust pipe ball connector affording adequate movement for accommodating discrepancies in dimensions upon initial installation, for taking care of motions due to thermal expansion and contraction and for taking care of some motion during operation; for example, due to relative displacement between the engine and the muffler.

Another object of the invention is to provide an exhaust pipe ball connector which can readily and economically be fabricated and utilized.

A further object of the invention is to provide an exhaust pipe ball connector that is generally an improvement over previously available exhaust pipe ball connectors.

Other objects, together with the foregoing, are set forth in the accompanying description and are illustrated in the accompanying drawing, in which:

The single FIGURE on the lower half is a side elevation of an exhaust pipe ball connector pursuant to the invention, and on the upper half is a cross section through such connector on a radial plane.

While the precise construction and configuration of the exhaust pipe ball connector pursuant to the invention can be varied in numerous ways, it has successfully been incorporated as illustrated herein for use with a turbine or engine having a circular-cylindrical exhaust pipe 6 generally disposed along an axis 7. Hot gases from the exhaust pipe 6 are to be directed into a tail pipe 8, representing either a portion of a muffler or of some other gas discharging device.

The distance between the exhaust pipe 6 and the tail pipe 8 in an axial direction may vary from time to time on one vehicle or may vary from vehicle to vehicle. In addition, the axis 7 may not always coincide with the momentary axis of the pipe 8.

For use under these and related circumstances, I preferably provide a means for joining the pipes 6 and 8. The presently preferred structure includes a first ring 11. The ring 11 is an annulus having a circular-cylindrical inner surface 12 and a spherical outer surface 13, the mergers of the surfaces being slightly rounded. The first ring 11 is preferably fabricated of a metal that is a very good heat conductor and also is made to have a close-grained outer surface 13 for dimensional stability and low friction. For those and other reasons, it is presently preferred to make the first ring 11 of sintered iron so that it is quite compact and an excellent heat transfer agent. The ring is also conditioned externally, preferably by a steam treatment, so that the outer surface 13 has a low coefficient of friction.

Designed to fit within the first ring is an entrance sleeve 14. This is preferably fabricated of sheet metal such as aluminized steel having a predetermined, relatively thin wall dimensioned. The sleeve 14 is generally a circular-cylindrical body and fits snugly within the first ring so that the sleeve is in close thermal contact with the inner surface 12. The end of the entrance sleeve is provided with a circumferential, out-turned flange 16 seated against the curved end of the first ring 11 and is likewise provided with a peripheral, outwardly extending bead 15. The bead abuts closely against the curved end surface of the entrance ring so that, in effect, the ring and sleeve are held in close mechanical connection and also in excellent heat transfer relationship.

Although many different manners of connection may be utilized, it is convenient to provide a standard clamp band 17 around the end of the entrance sleeve so that that sleeve can be closed against the pipe 6. Axial end slots 18 are provided in the margin of the entrance sleeve so that some slight deformity of the sleeve effectuates a close fit.

At a convenient distance downstream from the entrance sleeve and from the first ring 11, there is provided a second ring 21. This is preferably identical to the first ring 12 and is usually disposed approximately coaxially therewith. The ring 21 has a circular-cylindrical inner surface 22 and a spherical outer surface 23, the two surfaces merging in rounded ends.

An exit sleeve 26 is fabricated of material similar to that of the entrance sleeve. It is a generally circular-cylindrical body, at one end having a spherical portion 27 with a spherical inner surface 28 slidably engaging the surface 23 and with a spherical outer surface 29. The sleeve 26 is provided with slots 31 axially extending into one end so that the sleeve can be slightly deformed over and tightly clamped against a pipe 8 by a constricting band 32 or other suitable fastening device.

Engaged with the second ring 21 is a downstream tube 41 comprised of the same material as the exit and entrance sleeves and of generally circular-cylindrical configuration. The tube 41 is about the same diameter as the sleeve 26 and at one end has an out-turned flange 42 lying closely against the end of the second ring 21. Upstream from the flange 42 the downstream tube has an out-turned bead 43 lying against the other end of the second ring 21. The ring and tube are mechanically closely related and are so tightly fastened together as to afford good heat transfer characteristics.

At one end disposed within the downstream tube in a telescopic fashion is an upstream tube 46, likewise constructed of the same wall material as the sleeves. At one end the tube 46 has a spherical portion 47 with an inner spherical surface 48 slidably engaging the outer spherical surface 13 and with an outer surface 49 of spherical configuration. The upstream tube 46 has an intermediate portion 51 with its diameter sufficiently reduced so as to provide an extension 52 slidably engaged within the surrounding portion of the downstream tube 41. There is a substantial telescopic overlap of the portions 52 and 41, both of which in part normally extend well within and in good thermal relationship with the second ring 21. The relationship of the parts 41 and 52 is such that they have substantial relative axial movement in order to change the center-to-center distance between the rings 11 and 21. Because there is some slight clearance between these parts, it is preferred to dispose within the bead 43 a finely wound, metallic seal 53. This is usually an annular springlike member allowing axial motion but substantially blocking gas flow through any space between the portions 41 and 52.

With an arrangement of this sort, the mounting of the ball connector is always with the upstream sleeve 14 adjacent the incoming gases. As such gases travel through the sleeve 14 into the tube 46, their velocity tends to keep them from reversing into and leaking between the spherical surfaces. Since those gases are quite hot it is important that the ring 11 and the upstream or entrance sleeve be in close thermal relationship so that the relatively thin sheet metal afforded a heat sink. The ring 11 acts in that fashion and, being close to the exterior, serves as a massive radiator of heat.

Somewhat similarly, gases flowing downstream through the extension 52 tend to travel past the space between that extension and the member 41 and to move away from the space between the second ring 21 and the sphere 29. If there is a gas leakage, it tends to be atmospheric air moving into the interior of the connector by injection and this is beneficial. Here also, the metal sleeves 52 and 22 are in close juxtaposition not only with each other but also with the ring 21. The ring thus serves as a heat sink for the relatively thin sheet metal, thus precluding overheating of the sheet metal and rapid erosion and heat deterioration thereof. Additionally, the principal sliding surface affected by separation and approaching movement of the ball joints is within the ring 21. This maintains the parts very close to their original, cold configuration. Distortion due to heat is greatly minimized. It is found in practice that the ball connector continues to operate satisfactorily after it has been in long, severe service.

In most cases, the ball connector, when first installed, is set with the spheres located at an axial spacing so that the pipes 6 and 8 are well connected. The axial distance may vary from case to case. The overlap between the members 41 and 52 may vary from installation to installation. After installation, there is often very little axial motion, such motion as there may be being taken up by relative motion between the parts 41 and 52. Each ball or spherical connection allows a total of about 20° angular or swinging movement about the center of each sphere. This is adequate for most commercial installations. Variations in temperature of the units between hot and cold cause some creeping and movement of the parts but with the sliding members back up by the massive rings 11 and 21, the shape of the parts does not substantially vary whether hot or cold or whether new or old.

What is claimed is:

1. An exhaust pipe ball connector comprising a first ring having a circular-cylindrical interior surface and a spherical outer surface, an entrance sleeve having one end disposed within said first ring against said interior surface, means on said entrance sleeve providing an out-turned flange abutting one edge of said first ring, means on said entrance sleeve providing an external bead abutting the other edge of said first ring, a second ring having a circular-cylindrical interior surface and a spherical outer surface, an exit sleeve, means on said exit sleeve forming a spherical inner surface disposed against said spherical outer surface on said second ring, a downstream tube having one end disposed within said second ring against said interior surface, means on said downstream tube providing an out-turned flange abutting one edge of said second ring, means on said downstream tube providing an external bead abutting the other edge of said second ring, an upstream tube, means on said upstream tube forming a spherical inner surface disposed against said spherical outer surface on said first ring, means on said upstream tube telescoping within said downstream tube, and a seal disposed in said external bead on said downstream tube and abutting the telescoping portion of said upstream tube.

2. A connector as in claim 1 in which said first and second rings are of heat-conducting, solid material.

3. A connector as in claim 1 in which said entrance sleeve, said exit sleeve, said upstream tube and said downstream tube are all of substantially the same thickness of sheet metal.

4. A connector as in claim 1 in which at least some of the telescoping portions of said upstream tube and said downstream tube lie within said second ring.

5. A connector as in claim 1 in which said spherical outer surface of said first ring and said spherical inner surface of said upstream tube slide over each other, said spherical outer surface of said second ring and said spherical inner surface of said exit sleeve slide over each other, and the telescoping portions of said upstream tube and said downstream tube slide over each other.

* * * * *